(12) United States Patent
Buschjohann et al.

(10) Patent No.: US 8,083,244 B2
(45) Date of Patent: Dec. 27, 2011

(54) FRONT-AXLE BRACKET FOR MOTOR VEHICLES

(75) Inventors: Thomas Buschjohann, Nordstemmen (DE); Heiko Kauert, Blankenfelde (DE); Juergen Eickmann, Schellerten (DE); Andreas Hennings, Heidelberg (DE); Andreas Buehrig-Polaczek, Aachen (DE); Lars Wuerker, Remscheid (DE); Klaus Greven, Hildesheim (DE)

(73) Assignee: KSM Castings GmbH, Hildesheim (DE)

( * ) Notice: Subject to any disclaimer, the term of this patent is extended or adjusted under 35 U.S.C. 154(b) by 0 days.

(21) Appl. No.: 12/800,031

(22) Filed: May 6, 2010

(65) Prior Publication Data

US 2010/0289240 A1 Nov. 18, 2010

Related U.S. Application Data

(63) Continuation of application No. PCT/DE2008/001816, filed on Nov. 5, 2008.

(30) Foreign Application Priority Data

| Nov. 8, 2007 | (DE) | 10 2007 053 159 |
| Dec. 28, 2007 | (DE) | 10 2007 063 319 |
| Apr. 30, 2008 | (DE) | 10 2008 021 792 |
| Oct. 9, 2008 | (DE) | 10 2008 050 886 |

(51) Int. Cl.
*B60G 7/02* (2006.01)

(52) U.S. Cl. .............................. 280/124.109

(58) Field of Classification Search ........... 280/124.109, 280/124.11, 787, 788
See application file for complete search history.

(56) References Cited

U.S. PATENT DOCUMENTS

| 5,280,957 A * | 1/1994 | Hentschel et al. ............ 280/788 |
| 5,482,321 A * | 1/1996 | Soeffge et al. ................ 280/781 |
| 2009/0051154 A1 | 2/2009 | Eickmann et al. |

FOREIGN PATENT DOCUMENTS

| DE | 10 2006 039 684 | 2/2008 |
| EP | 1 304 280 | 4/2003 |
| EP | 1 386 827 | 2/2004 |
| EP | 1 413 636 | 4/2004 |
| EP | 1 787 894 | 5/2007 |
| JP | 10-110231 | 4/1998 |
| JP | 2002-047524 | 2/2002 |
| WO | WO 02/26548 | 4/2002 |
| WO | WO 2007/025528 | 3/2007 |
| WO | WO 2007/031060 | 3/2007 |

OTHER PUBLICATIONS

International Search Report of PCT/DE2008/001816.

(Continued)

*Primary Examiner* — Faye M. Fleming
(74) *Attorney, Agent, or Firm* — Collard & Roe, P.C.

(57) ABSTRACT

A front-axle bracket for motor vehicles has two accommodations spaced apart from one another in the longitudinal vehicle direction in each instance for the bearing locations for pivoting mounting of one of two wheel guide elements, in each instance, such as transverse control arms or A-arms, accommodations for attachment of the front-axle bracket as a pre-finished unit, together with pre-assembled assemblies, on the vehicle body, and at least individual ones of accommodations for attachment of the steering gear mechanism, for attachment of the stabilizer, and for mounting of a pendulum support. The front-axle bracket is produced as a component that is in one piece with these accommodations and connects them with one another.

42 Claims, 2 Drawing Sheets

OTHER PUBLICATIONS

English translation of the International Preliminary Report on Patentability and Written Opinion of the International Searching Authority.
DIN 50125, Jul. 2009, pp. 1-14.
DIN EN 10 002, 1990-1991.
John E. Hatch, "Aluminium Properties and Physical Metallurgy," 1984, American Society for Metals, US, Ohio, pp. 340-349, XP-002524400.

* cited by examiner

FRONT-AXLE BRACKET FOR MOTOR VEHICLES

CROSS REFERENCE TO RELATED APPLICATIONS

Applicants claim priority on and this application is a continuation under 35 U.S.C. 120 of International Application No. PCT/DE2008/001816 filed on Nov. 5, 2008, which claims priority under 35 U.S.C. 119 of German Application No. 10 2007 053 159.3 filed on Nov. 8, 2007, German Application No. 10 2007 063 319.1 filed on Dec. 28, 2007, German Application No. 10 2008 021 792.1 filed on Apr. 30, 2008, and German Application No. 10 2008 050 886.1 filed on Oct. 9, 2008. The International Application under PCT Article 21(2) was not published in English. Applicants also claim priority under 35 U.S.C. 119 of German Application No. 10 2007 053 159.3 filed on Nov. 8, 2007, German Application No. 10 2007 063 319.1 filed on Dec. 28, 2007, German Application No. 10 2008 021 792.1 filed on Apr. 30, 2008, and German Application No. 10 2008 050 886.1 filed on Oct. 9, 2008. The disclosure of the aforesaid International Application and German applications are incorporated by reference.

BACKGROUND OF THE INVENTION

1. Field of the Invention

The present invention relates to a front-axle bracket for motor vehicles.

2. Description of the Related Art

The present invention relates to a front-axle bracket for motor vehicles.

Such brackets, which are also referred to as saddles, frames, or auxiliary frames, are attached to vehicle structures, for example to the car body and/or to longitudinal supports of a vehicle, as pre-assembled units or modules, after they have been provided with assemblies or auxiliary assemblies.

A front-axle bracket is disclosed, for example, in WO 2007/031060 A1, which goes back to the same applicant.

SUMMARY OF THE INVENTION

Proceeding from this state of the art, it is an object of the invention to further optimize a front-axle bracket of the type stated initially with regard to weight and costs, without the optimization of the front-axle bracket having a disadvantageous effect on the chassis kinematics. Preferably, the chassis kinematics are intended to be improved.

In this connection, it is a further object of the invention to provide a front-axle bracket of the type stated initially, which demonstrates improved rigidity, particularly in the transverse direction, in order to absorb the high static and dynamic forces that engage on the front-axle bracket. Furthermore, such a front-axle bracket is intended to be configured to be particularly resistant to bending and twisting.

In this connection, it is another object of the invention to provide such a front-axle bracket that demonstrates particularly great strength and withstands great long-term stresses, particularly also at its linking or connecting parts, respectively, or its accommodations or recesses, respectively.

In this connection, it is another object to provide a front-axle bracket of the type stated initially, which optimally withstands or absorbs spring forces or damping forces that occur during driving operation, as well as tensile surges and pressure surges.

In this connection, it is further object of the invention to provide a front-axle bracket of the type stated initially, which accommodates as many parts that belong to the chassis and/or the power train as possible, which cannot be directly attached to the car body structure for reasons of requirements concerning assembly, car body stress, comfort, and stiffness. In particular, a front-axle bracket of the type stated is intended to be made available, which allows pre-assembly and pre-adjustment or adjustment of these parts in a module, in particularly simple manner, and then can be attached to the car body structure in particularly simple manner. In particular, the maintenance, repair, assembly, and disassembly of these parts are also intended to be facilitated. Furthermore, a front-axle bracket of the type stated initially is intended to be made available, which requires only a small amount of construction space in the motor vehicle.

Another object of the invention is to provide a front-axle bracket of the type stated, which better damps the transfer of noise and vibrations, particularly vibrations of assemblies. Furthermore, it must meet the requirements concerning inherent frequency. Also, a front-axle bracket is intended to be made available that demonstrates optimized behavior in the event of a crash.

These and other objects are achieved by a front-axle bracket in accordance with the invention. Further developments and advantageous embodiments of the invention are discussed below.

The invention provides a front-axle bracket for motor vehicles, in which two accommodations spaced apart from one another in the longitudinal vehicle direction are provided, in each instance, for the bearing locations for pivoting mounting of one of two wheel guide elements, in each instance, such as transverse control arms or A-arms, and accommodations for attachment of the front-axle bracket as a pre-finished unit, together with pre-assembled assemblies, on the vehicle body, are provided, as well as at least individual ones of the accommodations listed below, for attachment of the steering gear mechanism,
attachment of the stabilizer,
mounting of a pendulum support, and the front-axle bracket is produced as a component that is in one piece with these accommodations and connects them with one another.

It is practical if the accommodations are connected with one another in such a manner that weight-reducing recesses in the form of perforations and/or cavities that are open on one side remain in the front-axle bracket, without any disadvantageous influence on the chassis kinematics.

Furthermore, at least individual ones of the accommodations may be at least partly integrated into the front-axle bracket and/or connected with one another by way of rod-shaped and/or surface-shaped connecting elements.

Furthermore, at least individual ones of the accommodations may be at least partly integrated and/or connected with one another by way of open-profile-shaped connecting elements, particularly ones having a cross-section essentially in the shape of a T, U, V, L, X, Y, S, Z and/or double T.

Furthermore, the open-profile-shaped connecting elements may be oriented differently, preferably horizontally or vertically.

It is practical if individual shanks of the open-profile-shaped connecting elements are designed as reinforcement ribs.

Preferably, the connecting elements have additional reinforcement ribs, belts, beading, beads, crosspieces and/or perforations.

In an advantageous embodiment of the invention, the rear accommodation, in the direction of travel, for mounting of each of the wheel guide elements, possesses accommodation elements that are spaced apart, at least approximately vertical to the longitudinal vehicle axis, for surrounding and holding the rear bearing, in the direction of travel, on the wheel guide element. The accommodation elements are connected with one another by way of a U-shaped tab and are integrated into the front-axle bracket.

It is advantageous if the tab has a reinforced edge, at least in part, preferably on its outside.

Furthermore, the tab may be connected with a first accommodation for attachment means for fixing the front-axle bracket in place on the vehicle body, by way of at least one connecting element.

Advantageously, the tabs may be connected with the first accommodations, and the first accommodations may be connected with one another, by way of a single rod-shaped or open-profile-shaped connecting element, whereby the open-profile-shaped connecting element preferably has a U-shaped cross-section.

Furthermore, at least one accommodation for attachment means for fixing the exhaust system in place is provided on the connecting element that connects the first accommodations with one another, preferably on the side that faces opposite the direction of travel. Preferably, two such accommodations are provided.

In an advantageous embodiment of the invention, the accommodations for attachment means for fixing the exhaust system in place and/or the first accommodations are integrated into and/or onto the side wall that faces opposite the direction of travel, which is formed by one of the shanks of the U-shaped connecting element, and/or onto and/or into a planar reinforcement lip that follows it.

It is practical if the connecting element that connects the first accommodations with one another has a planar reinforcement lip, disposed essentially horizontally, on its underside, in and/or opposite the direction of travel.

It is advantageous if reinforcement ribs are provided within the profile-shaped connecting element that connects the accommodations, tabs and/or first accommodations, which ribs preferably lead from one side wall to the other side wall, straight or in zigzag shape, and/or preferably lead from the accommodations disposed in and/or on the one side wall to the opposite side wall, preferably at a slant and/or preferably in opposite directions.

Furthermore, the tab that connects the accommodation elements may be connected with the accommodation for attachment of the steering gear mechanism, disposed in the direction of travel, by way of a connecting element.

Furthermore, the accommodation for attachment of the steering gear mechanism may be connected with the second accommodation for attachment of the front-axle bracket to the vehicle body, disposed in the direction of travel, by way of a connecting element that is preferably at least partly rod-shaped. This accommodation, in turn, is directly connected with the front accommodation, in the direction of travel, for mounting of each of the wheel guide elements, preferably integrated into a side arm.

Preferably, one of the accommodations for attachment of the stabilizer is linked with the connecting element that connects the accommodation for attachment of the steering gear mechanism with the second accommodation or the side arm, respectively.

The front accommodation for mounting of each of the wheel guide elements, in the direction of travel, may furthermore possess two accommodation elements that are spaced apart at least approximately in the longitudinal vehicle axis, for enclosing and holding the front bearing of the wheel guide element, in the direction of travel, in U shape. The one accommodation element preferably follows the side arm of the accommodation directly, and the other accommodation element is integrated within the short shank of an L-shaped tab, which preferably follows the side arm with its end that does not have the accommodation element.

Preferably, the tab has a reinforced edge at least in part, preferably on its outer side.

In a further embodiment, the side arm has a recess that is introduced on one or both sides.

Furthermore, the side arm may have a recess that goes through.

In an advantageous embodiment of the invention, an accommodation for attachment of the stabilizer is provided within the recess, which accommodation is connected with the inner wall of the side arm, preferably by way of a crosspiece, in the case of a cavity that goes through, or is integrated into the remaining surface, in the case of a cavity that does not go through, and is preferably disposed directly on the inner wall of the side arm and/or connected with the inner wall(s) or reinforcement surfaces of the side arm, preferably provided with at least one reinforcement rib.

It is advantageous if the front-axle bracket has a reinforcement element that connects the side arms in the transverse direction, in which or on which element the accommodation for mounting of the pendulum support is disposed.

Furthermore, the reinforcement element may be configured in rod shape.

It is practical if the reinforcement element is configured in the shape of an open profile, particularly having a cross-section essentially in the shape of a T, U, V, or L, whereby preferably, the edges and borders of the reinforcement element are at least partially reinforced. Preferably, in the region of the accommodation for mounting of the pendulum support, the reinforcement element has at least one, preferably two reinforcing slanted surfaces, namely one on each side of the accommodation, in each instance, connected with it, which surface preferably drops downward from an essentially horizontally disposed partial surface of the reinforcement element, opposite the direction of travel.

In a further embodiment, one or more horizontally disposed, planar reinforcement lips are disposed on the side facing in and/or opposite the direction of travel.

Preferably, the horizontally disposed reinforcement lip is configured to be level.

Furthermore, the horizontally disposed reinforcement lip may be disposed in a plane underneath the bores provided in the accommodation elements.

It is advantageous if one of the accommodations for attachment of the steering gear mechanism is connected with the reinforcement element by way of a preferably rod-shaped connecting element.

Preferably, the first accommodation for attachment of the front-axle bracket to the vehicle body forms the rear end of the front-axle bracket.

Furthermore, the accommodation for mounting of the pendulum support may have a connecting element that runs in the direction of one of the first accommodations, and is directly or indirectly connected with it.

In a practical embodiment of the invention, the accommodation for mounting of the pendulum support is connected with one of the accommodations for attachment of the steering gear mechanism by way of a connecting element.

It is advantageous if the reinforcement element has node points at the ends that lead to the side arms, in which at least individual, preferably multiple preferably rod-shaped connecting elements run together.

Preferably, the front-axle bracket is produced from light metal, preferably from an aluminum alloy.

In an advantageous embodiment of the invention, the component is produced using a light-metal, preferably aluminum casting method, particularly preferably using the chill-casting method.

Furthermore, the area of the recesses delimited by the connecting elements may be greater, in a top view of the front-axle bracket, than the area of the front-axle bracket through which there is no passage, in a top view of the front-axle bracket.

Preferably, the front-axle bracket has two accommodations for attachment of the steering gear mechanism.

It is practical if the accommodations for attachment of the steering gear mechanism and/or the accommodations for attachment of the stabilizer are linked with the rod-shaped connecting elements by way of crosspieces.

In a preferred embodiment of the invention, at least individual ones of the accommodations are integrated into the front-axle bracket by way of rod-shaped connecting elements, in framework-like manner.

As a result, material and therefore weight of the vehicle itself are saved, along with fuel, for one thing, and for another, the transport costs and the spring-mounted masses can be reduced.

The rod-shaped connecting elements, which essentially delimit compartments without material, ensure the required rigidity in this connection, without any disadvantageous influence on the chassis kinematics. In this regard, the rod-shaped connecting elements can also be referred to as rod-shaped reinforcement elements.

When accommodations are mentioned within the scope of the present invention, this term also includes recesses.

In a further embodiment of the invention, two, preferably four, particularly preferably six, further particularly preferably eight, further particularly preferably ten of the accommodations are integrated into the front-axle bracket by way of rod-shaped connecting elements, in framework-like manner, preferably directly connected with one another.

As a result, further weight can advantageously be saved, whereby the required rigidity of the front-axle bracket is maintained. By means of such an embodiment, optimal strength values can be implemented, with the lowest possible use of material.

It is advantageously provided that the rear accommodation, in the direction of travel, for mounting of each of the wheel guide elements, possesses accommodation elements that are spaced apart, at least approximately vertical to the longitudinal vehicle axis, for enclosing and holding the rear bearing, in the direction of travel, on the wheel guide element. Preferably, each accommodation element is integrated into the front-axle bracket by way of at least one, preferably at least two rod-shaped connecting elements. Such an accommodation, which uses little material, fulfills its task without any negative influence on the required integration into the front-axle bracket.

Preferably, at least one, preferably every accommodation element is connected, by way of a rod-shaped connecting element, with a first accommodation for attachment means for fixing the front-axle bracket in place on the vehicle body.

In an advantageous embodiment of the invention, at least one accommodation element is connected, by way of a rod-shaped connecting element, with the front accommodation, in the direction of travel, for mounting of each of the wheel guide elements, whereby the rod-shaped connecting element preferably runs approximately in the longitudinal vehicle direction.

It is practical if the front accommodation, in the direction of travel, for mounting of each of the wheel guide elements, possesses two accommodation elements spaced apart at least approximately in the longitudinal vehicle axis, for enclosing the front bearing, in the direction of travel, in U shape and holding it on the wheel guide element.

It is advantageous if the front-axle bracket has at least one reinforcement element in the transverse direction, between the front accommodations, in the direction of travel, for mounting of each of the wheel guide elements, preferably in the form of a horizontally disposed surface element.

Such a reinforcement element absorbs the forces that act on the aforementioned accommodations in the transverse direction. Because the reinforcement element is configured in planar manner, the rigidity of the front accommodation element, in the direction of travel, of the aforementioned accommodation is furthermore increased, with the lowest possible use of material. Furthermore, such a reinforcement element can be disposed in such a manner that other assemblies, particularly engine and transmission, can be positioned close to the front-axle bracket. In this way, less construction space is required.

The horizontally disposed surface element is preferably configured to be level. The edge of the surface element that faces in the direction of travel can additionally or alternatively have an indentation in a semi-oval shape.

Furthermore, the horizontally disposed surface element may be disposed in a plane underneath the bores provided in the accommodation elements.

Assemblies, particularly engine and transmission, can thereby be positioned very close to the front-axle bracket, so that less construction space is required in the vehicle.

Preferably, a first accommodation for attachment of the front-axle bracket to the vehicle body is provided, which forms the rear end of the front-axle bracket, in the direction of travel.

Preferably, a second accommodation for attachment of the front-axle bracket to the vehicle body is provided, which is disposed integrated into a side arm, in the immediate vicinity of the front accommodation, in the direction of travel.

It is advantageous if the front-axle bracket has an approximately central planar reinforcement element that directly follows the accommodation for mounting of the pendulum support, at least in part, and widens opposite the direction of travel.

By means of such an embodiment, optimal strength values can be implemented with the least possible use of material. Such an embodiment particularly counters vertical vibrations.

Preferably, the planar reinforcement element is delimited, at least in part, by reinforcement ribs.

Furthermore, the planar reinforcement element may form a type of bead toward the rear edge, opposite the direction of travel, which bead is configured to be hollow on the underside and possesses a V cross-section.

By means of such an embodiment, optimal strength values can be implemented, with the least possible use of material.

It is advantageous if the planar reinforcement element has node points at the rear edge, opposite the direction of travel, in which at least individual, preferably multiple rod-shaped connecting elements run together.

In an advantageous embodiment of the invention, the first accommodation for attachment of the front-axle bracket to the vehicle body is connected with the planar reinforcement element by way of at least one rod-shaped connecting element.

Furthermore, it is advantageous to provide at least one reinforcement rib on the planar reinforcement element, which rib is preferably disposed, in the longitudinal vehicle direction, at least partly between the rear edge of the planar reinforcement element and the accommodation for mounting of the pendulum support.

It is advantageous if the front-axle bracket is produced from light metal, preferably from an aluminum alloy. Furthermore, it can be advantageous if the component is produced using an aluminum casting process, preferably using the tilted chill-casting process.

In an advantageous embodiment, the area of the compartments delimited by the rod-shaped connecting elements is greater, in a top view of the front-axle bracket, than the area of the front-axle bracket through which there is no passage, in a top view of the front-axle bracket, preferably at least greater than the area of the reinforcement element through which there is no passage, in a top view of the front-axle bracket.

Furthermore, it is advantageous if the front-axle bracket only has two other accommodations for attachment of the steering gear mechanism.

According to a further embodiment, the accommodations for attachment of the steering gear mechanism and/or the accommodations for attachment of the stabilizer are linked with the rod-shaped connecting elements by way of crosspieces.

Preferably, the front-axle bracket according to the invention consists of an aluminum (Al) casting alloy as disclosed in WO 2007/025528 A2. The disclosure content of this publication is incorporated into this application, by an explicit statement that it belongs to the object of the present application.

Preferably, the front-axle bracket consists of an Al casting alloy that contains at least five of the alloy components listed below

| | |
|---|---|
| Si: | 2.5 to 3.3, preferably 2.7 to 3.1 wt.-% |
| Mg: | 0.2 to 0.7, preferably 0.3 to 0.6 wt.-% |
| Fe: | <0.18, preferably 0.05 to 0.16 wt.-% |
| Mn: | <0.5, preferably 0.05 to 0.4 wt.-% |
| Ti: | <0.1, preferably 0.01 to 0.08 wt.-% |
| Sr: | <0.03, preferably 0.01 to 0.03 wt.-% |
| Other: | <0.1 wt.-% | and, in addition, Cr in an amount that increases the strength of the alloy, as another alloy component, supplemented to 100 wt.-% with Al, in each instance.

Preferably, the front-axle bracket consists of an Al casting alloy that contains at least five of the alloy components listed below

| | |
|---|---|
| Si: | 2.5 to 3.3, preferably 2.7 to 3.1 wt.-% |
| Mg: | 0.2 to 0.7, preferably 0.3 to 0.6 wt.-% |
| Fe: | <0.18, preferably 0.05 to 0.16 wt.-% |
| Mn: | <0.5, preferably 0.05 to 0.4 wt.-% |
| Ti: | <0.1, preferably 0.01 to 0.08 wt.-% |
| Sr: | <0.03, preferably 0.01 to 0.03 wt.-% |
| Cr: | 0.3 to 1.3, preferably 0.4 to 1.0, particularly preferably 0.5 to 0.8 wt.-% |
| Other: | <0.1 wt.-% | and is supplemented to 100 wt.-% with Al, in each instance.

Such an Al casting alloy is stronger, more impact-resistant, and more ductile as compared with the state of the art.

The preferred alloying-in of Cr in the amounts stated leads to a significant improvement in the mechanical properties, which can already be recorded in the casting state, but particularly after solution annealing and aging, if applicable.

In particular, it has been shown that undesirable iron precipitates can be transformed into a more advantageous morphology, already in the casting state, by such additions of chrome.

For chassis applications, particularly for wheel-guiding components, overall increased mechanical characteristic values can be obtained in this manner.

The alloys according to the invention can contain contaminants that result from production, for example Pb, Ni, Zn, etc. as they are generally known to a person skilled in the art.

In an advantageous embodiment of the invention, CuNi is contained as an additional alloy component, by being alloyed in at the same time. It has been shown that additions of copper or nickel alone do not lead to any significant improvement in the mechanical properties. Alloying in copper and nickel at the same time, however, opens up new possibilities for use of the alloy, particularly in the area outside of the chassis, for components subject to temperature stress.

The alloys according to the invention demonstrate an improved strength/expansion ratio as compared with known Al casting alloys.

Fundamentally, a permanent-mold casting method is suitable as a production method for work pieces, components, or parts for or of chassis parts of motor vehicles, in particular, from the casting alloy according to the invention. Because of the very good mechanical properties in the case of work pieces, components, or parts that are subject to great stress, gravity chill-casting and low-pressure chill-casting are particularly suitable as production methods. In this connection, the counter-pressure chill-casting process (CPC process) has proven to be particularly preferred.

It can furthermore be advantageous if the alloy has a fine grain. For this purpose, so-called grain refiners are added to the alloy. Grain refinement is a melt treatment, whereby the term "grain refinement" is understood to mean an artificial increase in the number of seed crystals in the melt, which is brought about by means of the introduction and distribution of outside seed crystals. In this way, better feed capacity by means of improved mass feed, in particular, improved mold-filling and flow capacity, a reduction in the tendency to develop porosity and heat cracks, and a resulting increase in ductility, as well as a better surface composition of the casting alloy are achieved.

In order to achieve the advantages mentioned above or to develop them even further, it is advantageous if the cast components are heat-treated, particularly with the following parameters:

| | |
|---|---|
| Solution annealing | 490 to 540° C. for 1 to 10 hours |
| Annealing | 150 to 200° C. for 1 to 10 hours |

For some application cases, however, it can also be advantageous to undertake only a one-step annealing treatment, generally known as T4, T5, or 0, for example.

An increase in strength of the castings can advantageously be achieved by means of quenching the castings in water, while they are still hot, instead of allowing them to cool off slowly in air.

Aside from the advantages that have already been mentioned, which components composed of alloys according the invention demonstrate, the corrosion resistance is also significantly increased, due to the absence of the alloy components Cu and Zn. The product is also relatively inexpensive, because no alloy additives that would make it more expensive, such as Rare Earth (RE) metals, for example, are used, the usual melt treatment can be applied, and no special effort is required for separation of circuits. Likewise, for cost reasons, preferably no Ag is used as an alloy component.

Also, an excellent strength/expansion ratio is present, with excellent castability. The castability allows a casting that is free of large defects, known as blowholes, for one thing, and for another, the microstructure is positively influenced, in such a manner that the number of internal notches, which reduce elongation to fracture, is kept as low as possible.

The mold-filling capacity is also improved in the presence of Cr, according to the invention.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF PREFERRED EMBODIMENTS

Figure 1:
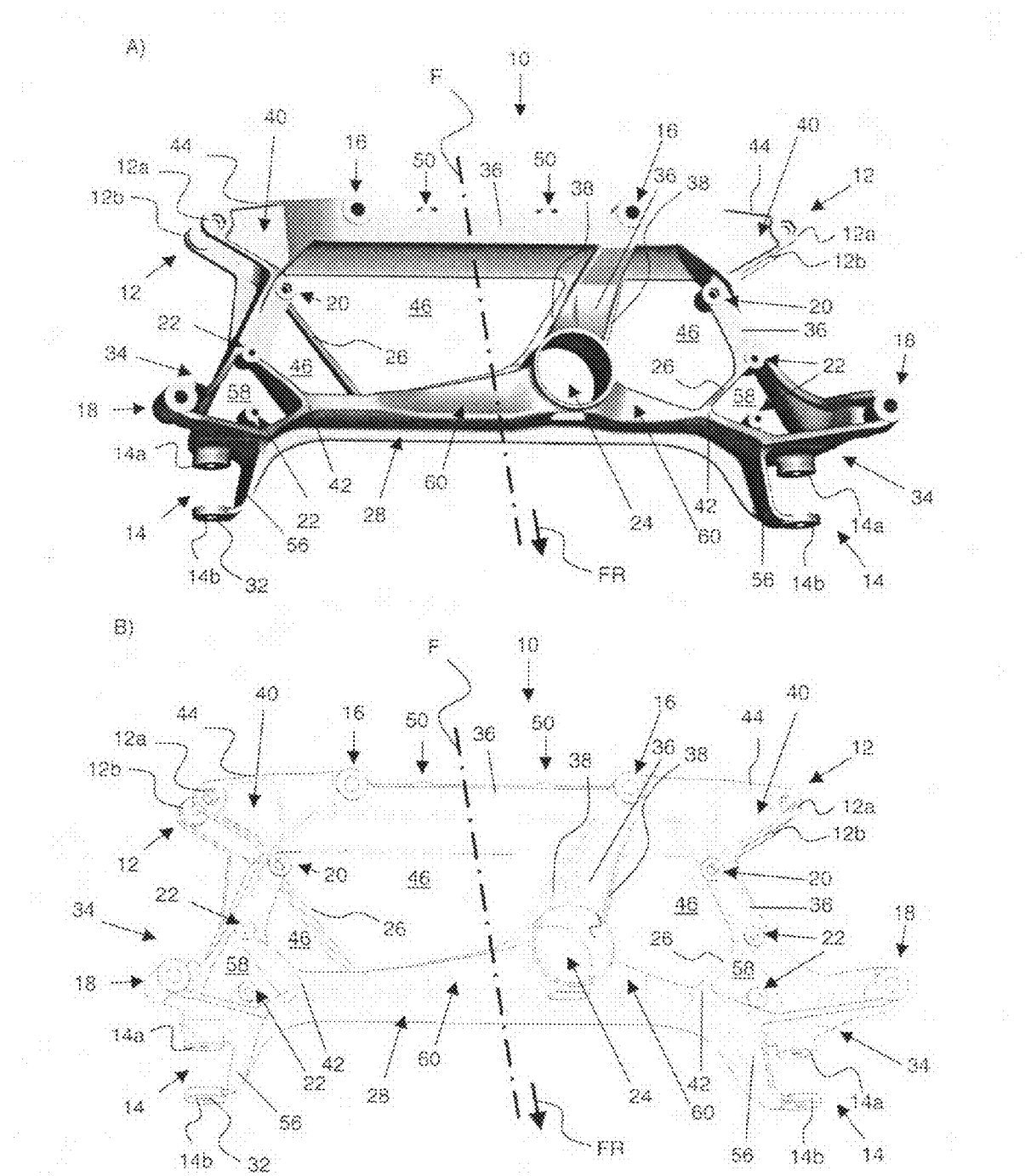
FIG. 1 is a top view in perspective of a front-axle bracket according to an embodiment of the invention.
Figure 2:
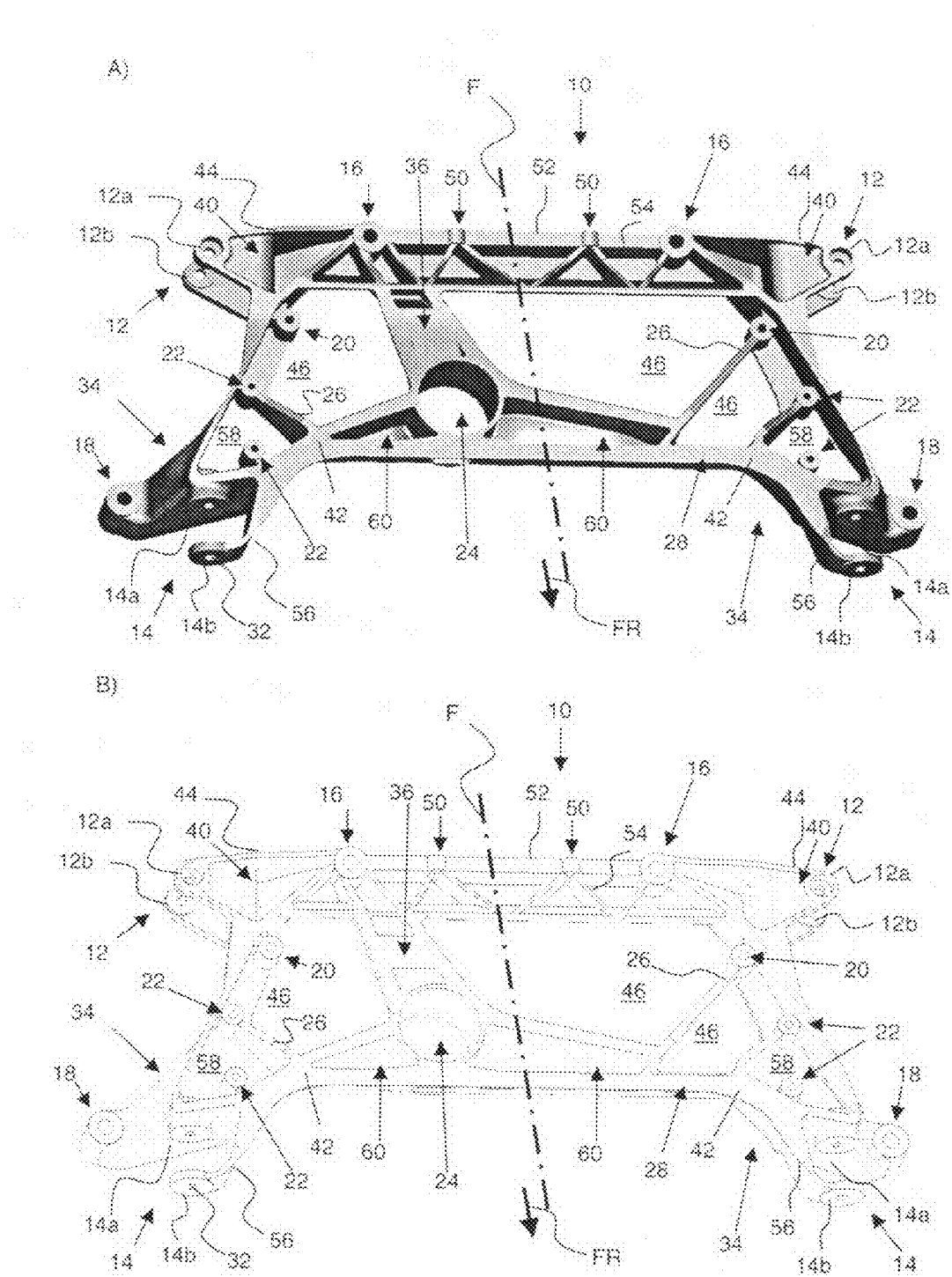
FIG. 2 is a bottom view in perspective of the embodiment of the front-axle bracket according to the invention, shown in FIG. 1.

Referring now in detail to the drawings, the front-axle brackets 10 for motor vehicles shown in FIGS. 1 and 2 comprise, in each instance, two accommodations 12, 14 for the bearing locations for pivoting mounting of one each of two transverse control arms, not shown here, which accommodations are spaced apart from one another in the longitudinal vehicle direction or axis F. Furthermore, two first accommodations 16 and two second accommodations 18, in each instance, are provided for attachment of the front-axle bracket 10 on the vehicle body.

Each front-axle bracket 10 furthermore has an accommodation 24 for mounting of a pendulum support, not shown here, and four accommodations 22 for attachment of a stabilizer, not shown here.

The front-axle bracket 10 shown in FIGS. 1 and 2 furthermore has two accommodations 20 for attachment of the steering gear mechanism, not shown here.

Individual ones of the accommodations 20 and 22 are integrated into the front-axle bracket 10 by way of rod-shaped connecting elements 26.

The rear accommodation 12, in the direction of travel FR, for mounting of each of the wheel guide elements or transverse control arms, possesses bearing accommodation elements 12a and 12b that are spaced apart, at least approximately vertical to the longitudinal vehicle axis F, for surrounding and holding the transverse control arm, not shown here, of the rear bearing, in the direction of travel FR.

The front accommodation 14, in the direction of travel FR, for mounting of each of the wheel guide elements or transverse control arms, possesses two bearing accommodation elements 14a and 14b spaced apart at least approximately in the longitudinal vehicle direction F, for surrounding the front bearing, in the direction of travel FR, in U shape, and holding it on the transverse control arm, not shown here.

The accommodations 12, 14, 16, 18, 20, 22, and 24 are connected with one another, in the front-axle bracket according to the invention, in such a manner that in particular, two large weight-reducing recesses in the form of perforations 46, but also cavities 30 that are open on one side, remain.

Individual ones of the accommodations, in the present exemplary embodiment particularly the accommodations 20, 22, are at least partly integrated into the front-axle bracket 10 and/or connected with one another by way of rod-shaped connecting elements 26, and, in the present exemplary embodiment, particularly the accommodations 16, 20, 22, and 24, are integrated and/or connected at least partly, by way of surface-shaped connecting elements 36, particularly open-profile-shaped connecting elements 36.

Accommodations 16 are integrated into the front-axle bracket 10 and connected with one another by way of an open-profile-shaped connecting element 36, for example, having an essentially U-shaped cross-section.

Accommodation 20 is connected with one of accommodations 22 by way of an open-profile-shaped connecting element 36, for example, having an essentially L-shaped cross-section, and integrated into front-axle bracket 10.

Accommodation 24 is connected with the connecting element 36 that connects accommodations 16 by way of an open-profile-shaped connecting element 36, for example, having an essentially U-shaped cross-section. The connecting element 36 mentioned first, having a U-shaped cross-section, has relatively short shanks, which are designed as reinforcement ribs 38. Furthermore, an additional reinforcement rib that runs crosswise is also provided on the top of this connecting element.

As has already been described, the rear accommodation 12, in the direction of travel FR, possesses bearing accommodation elements 12a, 12b that are spaced apart, at least approximately vertical to the longitudinal vehicle axis F, for surrounding and holding the rear bearing, in the direction of travel FR, on the wheel guide element.

According to the invention, the accommodation elements 12a, 12b are connected with one another and integrated into the front-axle bracket 10 by way of a U-shaped tab 40. Tab 40 has a reinforced edge 44 at least in part, preferably on its outside.

According to the invention, tab 40 is connected with a first accommodation 16 by way of at least one connecting element.

As can clearly be seen, the tabs 40 are connected with the first accommodations 16, and the first accommodations 16 are connected with one another, by way of a single open-profile-shaped connecting element 36, whereby the open-profile-shaped connecting element has an essentially U-shaped cross-section.

On the connecting element 36 that connects the first accommodations 16 with one another, preferably on the side that faces opposite the direction of travel FR, two accommodations 50 for attachment means for fixing the exhaust system, not shown here, in place, are provided.

According to the invention, in this connection, accommodations 50 and first accommodations 16 are integrated into and on the side wall that faces opposite the direction of travel FR, which is formed by one of the shanks of the U-shaped connecting element, as well as on and into a planar reinforcement lip 52 that follows it.

Reinforcement lip 52 is disposed essentially horizontally on the underside of the connecting element that connects the first accommodations 16 with one another, opposite the direction of travel FR.

Within the profile-shaped connecting element 36 that connects tabs 40 and first accommodations 16, reinforcement ribs 54 are provided, which lead to the opposite side wall, from the accommodations 16, 50 disposed in and on the one side wall, at a slant and in the opposite direction.

Accommodation 20 is connected with the second accommodation 18, disposed in the direction of travel FR, for attachment of front-axle bracket 10 on the vehicle body by way of an at least partly rod-shaped connecting element. Second accommodation 18 in turn is connected with the front accommodation 14, in the direction of travel FR, for mounting of each of the wheel guide elements, integrated into a side arm 34.

One of the accommodations 22 for attachment of the stabilizer is linked with the connecting element that connects accommodation 20 with second accommodation 18 or side arm 34, respectively.

The front accommodation 14, in the direction of travel FR, possesses two accommodation elements 14a, 14b spaced apart at least approximately in the longitudinal vehicle direction F, for surrounding the front bearing, in the direction of travel FR, in U shape, and holding it on the wheel guide element. One accommodation element 14a follows side arm 34 of accommodation 18 directly. The other accommodation element 14b is integrated within the short shank of an L-shaped tab 56, which preferably follows side arm 34 with its end that does not have the accommodation element.

According to the invention, tab 56 has a reinforced edge at least in part, preferably on its outer side.

Side arm 34 has a recess 58 that goes through.

Within recess 58, an accommodation 22 for attachment of the stabilizer is provided, which accommodation follows the inner wall of side arm 34 in the present cavity that goes through, by way of a crosspiece.

Front-axle bracket 10 has a reinforcement element 60 that connects the side arms 34 in the transverse direction, in which element the accommodation 24 for mounting of the pendulum support is disposed. Reinforcement element 60 is configured in open profile shape, with an essentially U-shaped cross-section, whereby the edges and borders of the reinforcement element 60 are reinforced. Furthermore, a horizontally disposed, planar reinforcement lip 28 is disposed on reinforcement element 60, in each instance, on the side that faces in and opposite the direction of travel FR.

This horizontally disposed reinforcement lip 28 is configured to be level and is disposed in a plane underneath the bores 32 provided in accommodation elements 14a, 14b.

One of the accommodations 20 is connected with reinforcement element 60 by way of a rod-shaped connecting element.

According to the invention, first accommodation 16 forms the rear end of front-axle bracket 10.

Accommodation 24 has a connecting element 36 that runs in the direction of one of the first accommodations 16, and is indirectly connected with this first accommodation 16.

Reinforcement element 60 has node points 42 at the ends that lead to the side arms, in which at least individual, preferably multiple preferably rod-shaped connecting elements run together.

Two of the four accommodations 22 are linked with front-axle bracket 10 by way of crosspieces.

Although at least one embodiment of the present invention has been shown and described, it is to be understood that many changes and modifications may be made thereunto without departing from the spirit and scope of the claims.

What is claimed is:

1. A front-axle bracket for a motor vehicle comprising
   (a) a one-piece bracket frame;
   (b) first and second rear accommodations;
   (c) first and second front accommodations spaced apart from the first and second rear accommodations, respectively, in a longitudinal vehicle direction, the first rear accommodation and the first front accommodation being provided for pivotal mounting at bearing locations of a first wheel guide element, the second rear accommodation and the second front accommodation being provided for pivotal mounting at bearing locations of a second wheel guide element;
   (d) a plurality of vehicle body accommodations for attachment of the one-piece bracket frame with pre-assembled assemblies as a pre-finished unit on a vehicle body, the plurality of vehicle body accommodations comprising first vehicle body accommodations;
   (e) at least one further accommodation selected from the group consisting of at least one steering gear mechanism accommodation for attachment of a steering gear mechanism, at least one stabilizer accommodation for attachment of a stabilizer, and at least one pendulum support accommodation for mounting of a pendulum support; and
   (f) at least one exhaust system accommodation for an attachment device for fixing an exhaust system in place;
   wherein the one-piece bracket frame connects the rear accommodations, the front accommodations, the vehicle body accommodations, and the at least one further accommodation with one another.

2. The front-axle bracket according to claim 1, wherein the rear accommodations, the front accommodations, the vehicle body accommodations, and the at least one further accommodation are connected with one another in such a manner that weight-reducing recesses in a form of at least one of perforations and cavities that are open on one side remain in the frame without any disadvantageous influence on chassis kinematics.

3. The front-axle bracket according to claim 2, wherein the recesses comprise a recess area delimited by connecting elements greater, in a top view of the frame, than a solid area of the frame having no passage, in a top view of the frame.

4. The front-axle bracket according to claim 1, wherein the frame comprises at least one of rod-shaped connecting elements and surface-shaped connecting elements and at least some accommodations selected from the group consisting of the rear accommodations, the front accommodations, the vehicle body accommodations, and the at least one further accommodation are at least one of integrated into the frame by way of the connecting elements and connected with one another, at least in part.

5. The front-axle bracket according to claim 4, wherein the connecting elements have at least one of reinforcement ribs, belts, beading, beads, crosspieces and perforations.

6. The front-axle bracket according to claim 4, wherein each rear accommodation comprises first and second rear accommodation elements spaced apart, at least approximately vertical to the longitudinal vehicle direction for surrounding and holding a rear bearing, in a travel direction, on the wheel guide element, wherein the first and second rear accommodation elements are connected with one another by way of a respective U-shaped tab and are integrated into the frame.

7. The front-axle bracket according to claim 6, wherein the tab has a reinforced edge at least on an outside portion of the tab.

8. The front-axle bracket according to claim 6, wherein the tab is connected with a first vehicle body accommodation of the plurality of vehicle body accommodations by way of at least one connecting element.

9. The front-axle bracket according to claim 8, wherein the first vehicle body accommodation forms a rear end of the frame.

10. The front-axle bracket according to claim 6, wherein the at least one further accommodation comprises a plurality of steering guide mechanism accommodations and each tab is connected with a respective steering guide mechanism accommodation disposed in the travel direction by way of a connecting element.

11. The front-axle bracket according to claim 1, wherein the frame comprises open-profile-shaped connecting elements having a cross-section essentially in the shape of at least one of a T, U, V, L, X, Y and double T and at least some of the accommodations, selected from the group consisting of the rear accommodations, the front accommodations, the vehicle body accommodations, and the at least one further accommodation are at least one of partly integrated into the frame and connected with one another by way of the open-profile-shaped connecting elements.

12. The front-axle bracket according to claim 1, wherein the open-profile-shaped connecting elements are oriented differently from each other.

13. The front-axle bracket according to claim 11, wherein at least some open-profile-shaped connecting elements have shanks designed as reinforcement ribs.

14. The front-axle bracket according to claim 1, further comprising a plurality of tabs, a profile-shaped connecting element comprising first and second side walls and connecting at least one of the rear accommodations, the tabs, and first vehicle body accommodations of the plurality of vehicle body accommodations, and a plurality of reinforcement ribs provided within the profile-shaped connecting element.

15. The front-axle bracket according to claim 1, wherein the plurality of vehicle body accommodations comprises first and second vehicle body accommodations, wherein the at least one further accommodation comprises at least one steering gear mechanism accommodation, wherein the at least one steering gear mechanism accommodation is connected with the second vehicle body accommodation disposed in a travel direction by way of a connecting element, and wherein the second vehicle body accommodation, in turn, is directed connected with the first front accommodation.

16. The front-axle bracket according to claim 15, wherein the at least one further accommodation comprises a plurality of stabilizer accommodations, wherein at least one stabilizer accommodation is linked with the connecting element or a side arm.

17. The front-axle bracket according to claim 1, wherein the first front accommodation comprises first and second front accommodation elements spaced apart at least approximately in the longitudinal vehicle direction, for enclosing and holding a front bearing of the first wheel guide element, in a travel direction, in U shape, wherein the first front accommodation element follows a side arm of the second vehicle body accommodation directly, and the second front accommodation element is integrated within a short shank of an L-shaped tab following the side arm with an end of the L-shaped tab that does not have the second front accommodation element.

18. The front-axle bracket according to claim 17, wherein the L-shaped tab has a reinforced edge at least in part on an outer side of the L-shaped tab.

19. The front-axle bracket according to claim 18, wherein the at least one further accommodation comprises first and second steering gear mechanism accommodations, wherein the first steering gear mechanism accommodation is connected with the reinforcement element by way of a rod-shaped connecting element.

20. The front-axle bracket according to claim 17, wherein the side arm has a recess on at least one side of the side arm.

21. The front-axle bracket according to claim 17, wherein the side arm has a recess that goes through the side arm.

22. The front-axle bracket according to claim 17, wherein the side arm has a recess, wherein the at least one further accommodation comprises at least one stabilizer accommodation provided within the recess, wherein the at least one stabilizer accommodation is connected with an inner wall of the side arm.

23. The front-axle bracket according to claim 17, further comprising a plurality of bores provided in the first and second front accommodation elements and at least one horizontally disposed planar reinforcement lip disposed in a plane underneath the bores.

24. The front-axle bracket according to claim 1, further comprising side arms and a reinforcement element that connects the side arms in a transverse direction, wherein the at least one further accommodation comprises at least one pendulum support accommodation disposed in or on the reinforcement element.

25. The front-axle bracket according to claim 24, wherein the reinforcement element is configured in rod shape.

26. The front-axle bracket according to claim 24, wherein the reinforcement element is configured in the shape of an open profile having a cross-section essentially in a shape of a T, U, V, or L, and wherein the reinforcement element has edges and borders at least partially reinforced.

27. The front-axle bracket according to claim 24, further comprising at least one horizontally disposed, planar reinforcement lip disposed on the reinforcement element on a side that faces in or opposite a travel direction.

28. The front-axle bracket according to claim 27, wherein the at least one horizontally disposed planar reinforcement lip is configured to be level.

29. The front-axle bracket according to claim 24, wherein the reinforcement element has node points at ends of the reinforcement element leading to side arms, and wherein at least individual rod-shaped connecting elements run together in the node points.

30. The front-axle bracket according to claim 1, wherein the at least one further accommodation comprises at least one pendulum support accommodation, wherein the at least one pendulum support accommodation has a connecting element that runs toward and is indirectly connected with a first vehicle body accommodation of the plurality of vehicle body accommodations.

31. The front-axle bracket according to claim 1, wherein the at least one further accommodation comprises at least one steering gear mechanism accommodation and at least one pendulum support accommodation connected with the at least one steering gear mechanism accommodation by way of a connecting element.

32. The front-axle bracket according to claim 1, wherein the frame is produced from an aluminum alloy.

33. The front-axle bracket according to claim 1, wherein the frame is produced using an aluminum casting method.

34. The front-axle bracket according to claim 1, wherein the at least one further accommodation comprises first and second steering gear mechanism accommodations.

35. The front-axle bracket according to claim 1, wherein the at least one further accommodation comprises at least one steering gear mechanism accommodation and at least one stabilizer accommodation and at least one of the at least one steering gear mechanism accommodation and the at least one stabilizer accommodation is linked with rod-shaped connecting elements by way of crosspieces.

36. The front-axle bracket according to claim 1, wherein at least some accommodations selected from the group consisting of the rear accommodations, the front accommodations, the vehicle body accommodations, and the at least one further accommodation are integrated into the frame by way of rod-shaped connecting elements.

37. The front-axle bracket according to claim 1, wherein the frame comprises an aluminum casting alloy that contains at least five of the alloy components:

| | |
|---|---|
| Si: | 2.5 to 3.3 wt.-%; |
| Mg: | 0.2 to 0.7 wt.-%; |
| Fe: | <0.18 wt.-%; |
| Mn: | <0.5 wt.-%; |
| Ti: | <0.1 wt.-%; |
| Sr: | <0.03 wt.-%; |
| Other: | <0.1 wt.-%; | whereby in addition, Cr in an amount that increases alloy strength is contained in the alloy as another alloy component, supplemented to 100 wt.-% with Al.

38. The front-axle bracket according to claim 1, wherein the frame comprises an aluminum casting alloy that contains at least five of the alloy components:

| | |
|---|---|
| Si: | 2.5 to 3.3 wt.-%; |
| Mg: | 0.2 to 0.7 wt.-%; |
| Fe: | <0.18 wt.-%; |
| Mn: | <0.5 wt.-%; |
| Ti: | <0.1 wt.-%; |
| Sr: | <0.03 wt.-%; |
| Cr: | 0.3 to 1.3 wt.-%; |
| Other: | <0.1 wt.-%; | and supplemented to 100 wt.-% with Al.

39. A front-axle bracket for a motor vehicle comprising:
(a) a one-piece bracket frame;
(b) first and second rear accommodations;
(c) first and second front accommodations spaced apart from the first and second rear accommodations, respectively, in a longitudinal vehicle direction, the first rear accommodation and the first front accommodation being provided for pivotal mounting at bearing locations of a first wheel guide element, the second rear accommodation and the second front accommodation being provided for pivotal mounting at bearing locations of a second wheel guide element;
(d) a plurality of vehicle body accommodations for attachment of the frame with pre-assembled assemblies as a pre-finished unit on a vehicle body, the plurality of vehicle body accommodations comprising first vehicle body accommodations;
(e) at least one further accommodation selected from the group consisting of at least one steering gear mechanism accommodation for attachment of a steering gear mechanism, at least one stabilizer accommodation for attachment of a stabilizer, and at least one pendulum support accommodation for mounting of a pendulum support;
(f) a plurality of tabs connected with the first vehicle body accommodations;
(g) a single rod-shaped or open-profile-shaped connecting element connecting the first vehicle body accommodations with one another; and
(h) at least one exhaust system accommodation for an attachment device for fixing an exhaust system in place, the at least one exhaust system accommodation being provided on the single rod-shaped or open-profile-shaped connecting element;
wherein the one-piece bracket frame connects the rear accommodations, the front accommodations, the vehicle body accommodations, and the at least one further accommodation with one another.

40. The front-axle bracket according to claim 39, wherein the single rod-shaped or open-profile-shaped connecting element that connects the first vehicle body accommodations with one another has a planar reinforcement lip, disposed essentially horizontally, on an underside portion of the single rod-shaped or open-profile-shaped connecting element in or opposite a travel direction.

41. A front-axle bracket for a motor vehicle comprising
(a) a one-piece bracket frame;
(b) first and second rear accommodations;
(c) first and second front accommodations spaced apart from the first and second rear accommodations, respectively, in a longitudinal vehicle direction, the first rear accommodation and the first front accommodation being provided for pivotal mounting at bearing locations of a first wheel guide element, the second rear accommodation and the second front accommodation being provided for pivotal mounting at bearing locations of a second wheel guide element;
(d) a plurality of vehicle body accommodations for attachment of the one-piece bracket frame with pre-assembled assemblies as a pre-finished unit on a vehicle body, the plurality of vehicle body accommodations comprising first vehicle body accommodations;
(e) at least one further accommodation selected from the group consisting of at least one steering gear mechanism accommodation for attachment of a steering gear mechanism, at least one stabilizer accommodation for attachment of a stabilizer, and at least one pendulum support accommodation for mounting of a pendulum support;
(f) a plurality of exhaust system accommodations for an attachment device for fixing an exhaust system in place;
(g) a U-shaped connecting element comprising first and second shanks, the first shank forming a side wall facing opposite a travel direction; and
(h) a first planar reinforcement lip following the U-shaped connecting element;
wherein the one-piece bracket frame connects the rear accommodations, the front accommodations, the vehicle body accommodations, and the at least one further accommodation with one another; and
wherein at least one of the exhaust system accommodations and the first vehicle body accommodations are at least one of integrated into the side wall, integrated onto the side wall, integrated into the first planar reinforcement lip, and integrated onto the first planar reinforcement lip.

42. A front-axle bracket for a motor vehicle comprising:
(a) a one-piece bracket frame;
(b) first and second rear accommodations;
(c) first and second front accommodations spaced apart from the first and second rear accommodations, respectively, in a longitudinal vehicle direction, the first rear accommodation and the first front accommodation being provided for pivotal mounting at bearing locations of a first wheel guide element, the second rear accommodation and the second front accommodation being provided for pivotal mounting at bearing locations of a second wheel guide element;
(d) a plurality of vehicle body accommodations for attachment of the frame with pre-assembled assemblies as a pre-finished unit on a vehicle body, the plurality of vehicle body accommodations comprising first vehicle body accommodations;
(e) at least one further accommodation selected from the group consisting of at least one steering gear mechanism accommodation for attachment of a steering gear mechanism, at least one stabilizer accommodation for attachment of a stabilizer, and at least one pendulum support accommodation for mounting of a pendulum support;
(f) a single rod-shaped or open-profile-shaped connecting element connecting the first vehicle body accommodations with one another; and
(g) at least one exhaust system accommodation for an attachment device for fixing an exhaust system in place, the at least one exhaust system accommodation being provided on the single rod-shaped or open-profile-shaped connecting element;
wherein the one-piece bracket frame connects the rear accommodations, the front accommodations, the vehicle body accommodations, and the at least one further accommodation with one another.

\* \* \* \* \*

UNITED STATES PATENT AND TRADEMARK OFFICE
CERTIFICATE OF CORRECTION

| | | |
|---|---|---|
| PATENT NO. | : 8,083,244 B2 | Page 1 of 1 |
| APPLICATION NO. | : 12/800031 | |
| DATED | : December 27, 2011 | |
| INVENTOR(S) | : Buschjohann et al. | |

It is certified that error appears in the above-identified patent and that said Letters Patent is hereby corrected as shown below:

Column 13, line 28 (Line 1 of Claim 12) please change "claim 1'" to correctly read: --claim 11--.

Signed and Sealed this
Seventeenth Day of April, 2012

David J. Kappos
*Director of the United States Patent and Trademark Office*